No. 740,273. PATENTED SEPT. 29, 1903.
R. H. HASSLER.
MOTOR CAR.
APPLICATION FILED NOV. 20, 1902.
NO MODEL. 7 SHEETS—SHEET 1.
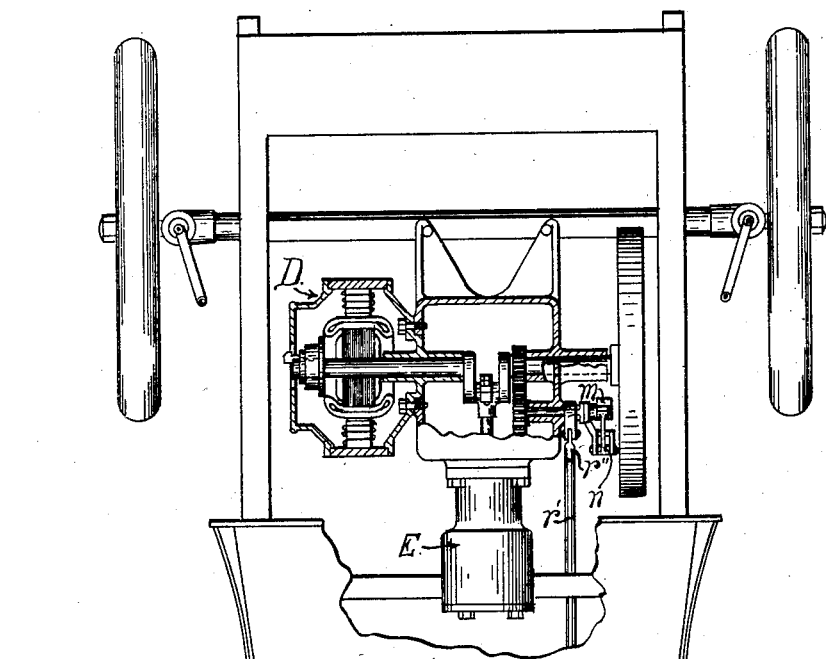
Fig.1.
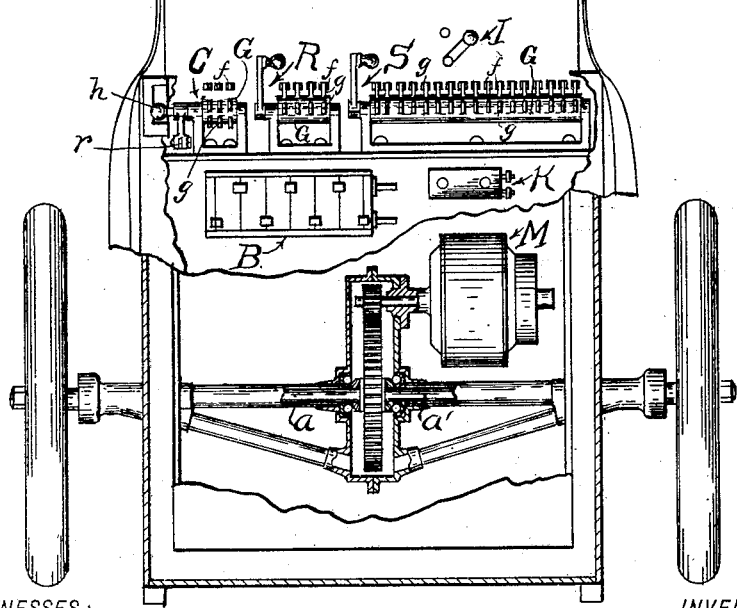
WITNESSES: INVENTOR
Robert H. Hassler,
BY Joseph A. Minturn
ATTORNEY No. 740,273. PATENTED SEPT. 29, 1903.
R. H. HASSLER.
MOTOR CAR.
APPLICATION FILED NOV. 20, 1902.
NO MODEL. 7 SHEETS—SHEET 2.

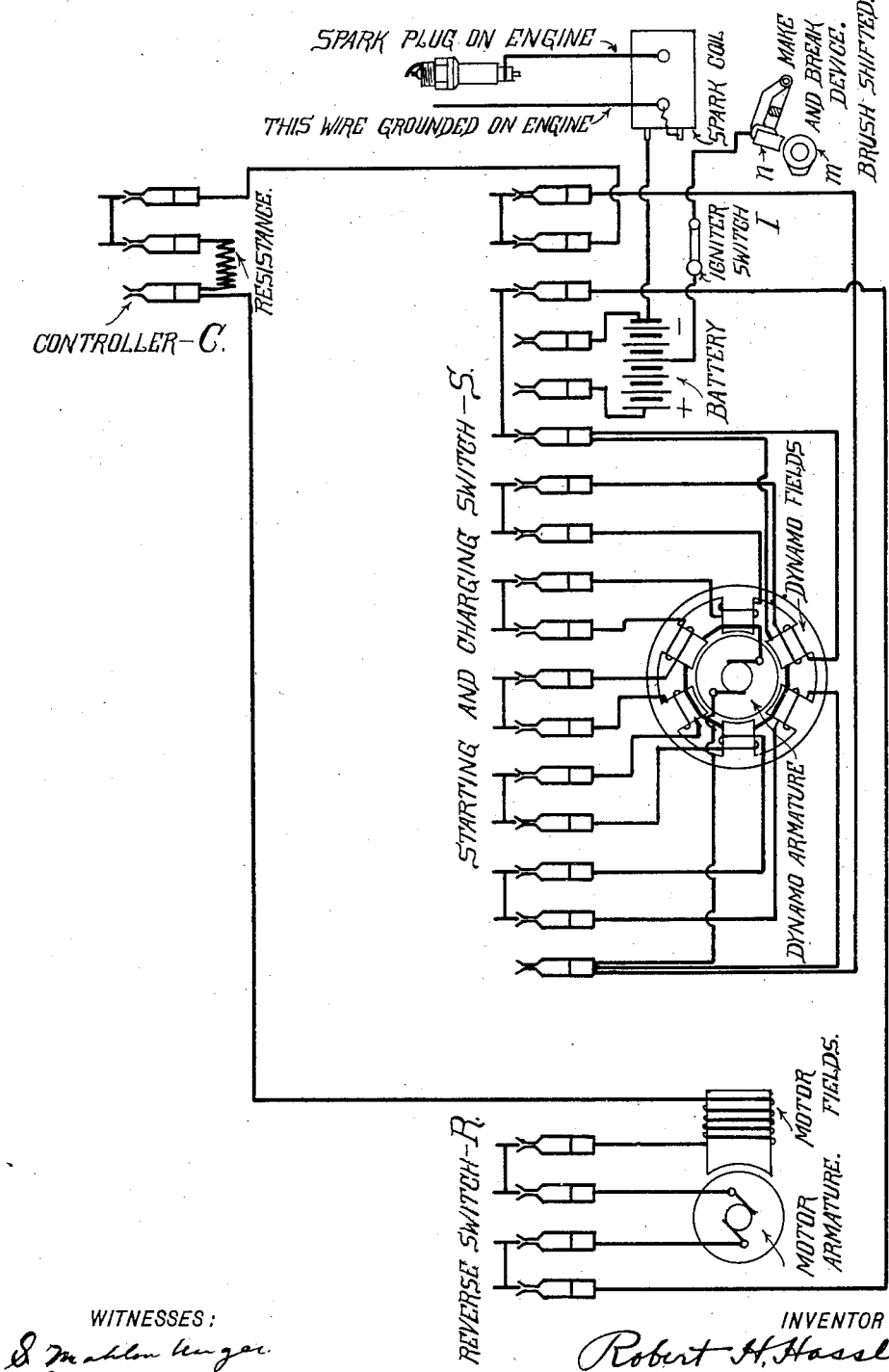

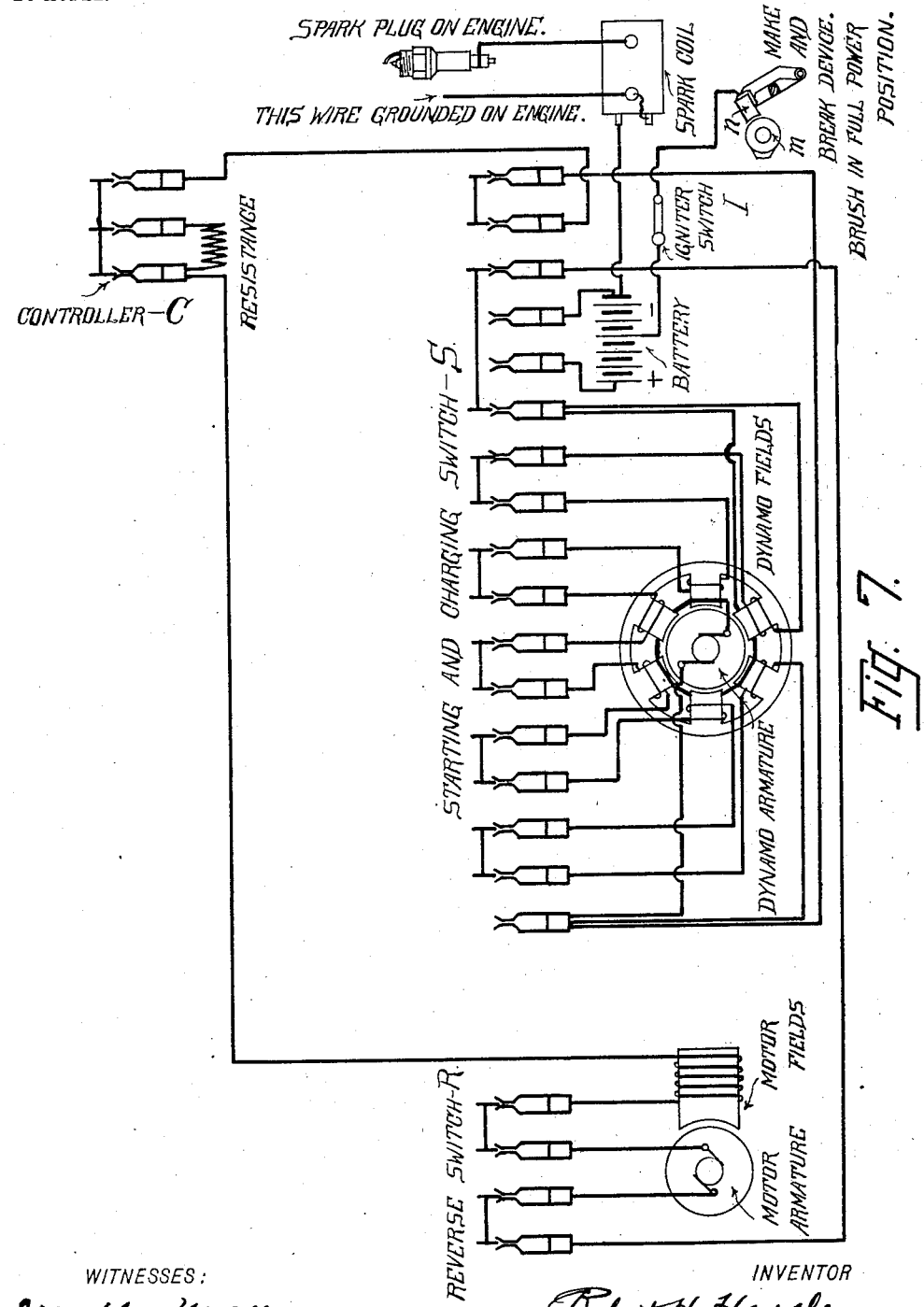

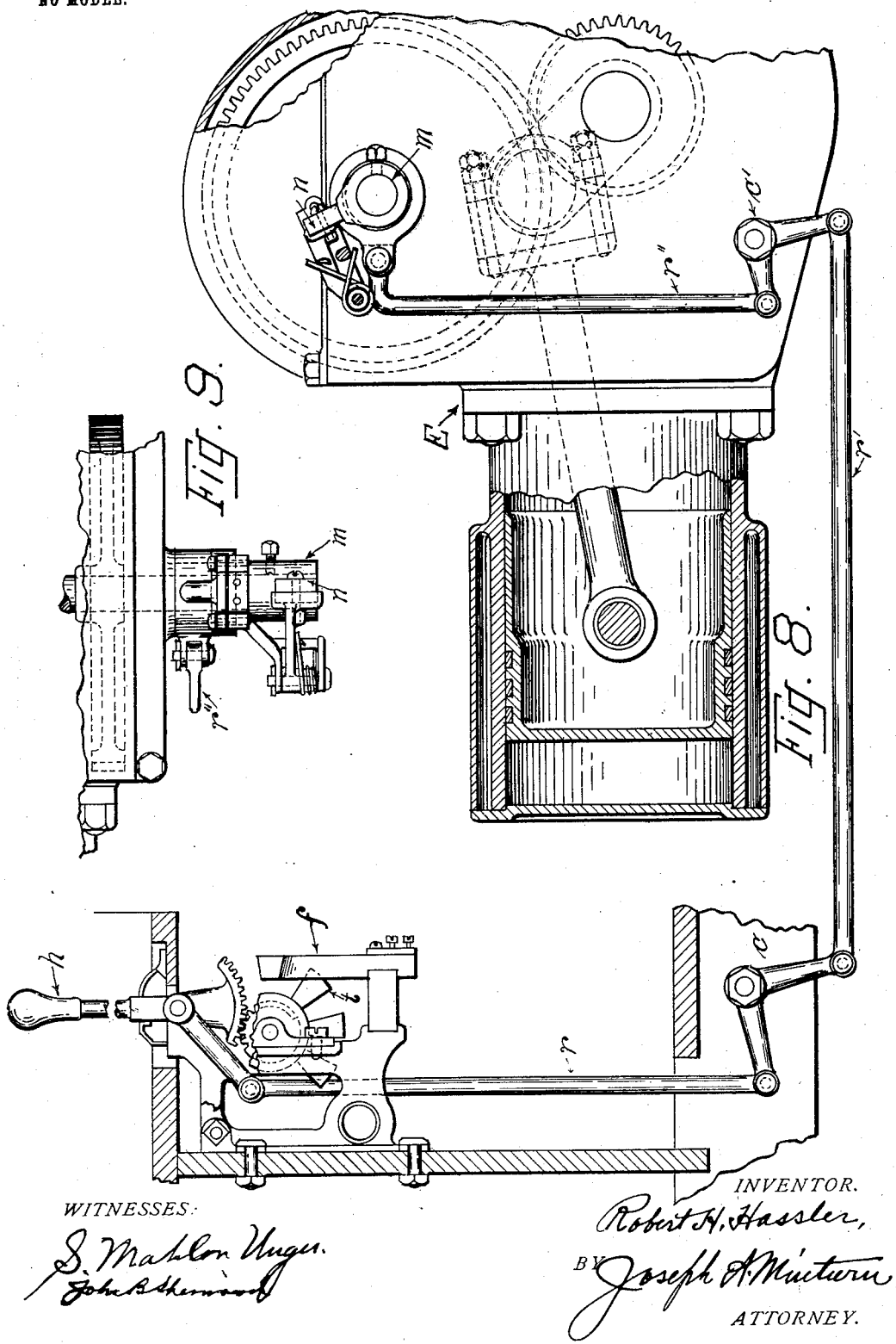

No. 740,273.

Patented September 29, 1903.

UNITED STATES PATENT OFFICE.

ROBERT H. HASSLER, OF INDIANAPOLIS, INDIANA.

MOTOR-CAR.

SPECIFICATION forming part of Letters Patent No. 740,273, dated September 29, 1903.

Application filed November 20, 1902. Serial No. 132,066. (No model.)

*To all whom it may concern:*

Be it known that I, ROBERT H. HASSLER, a citizen of the United States, residing at Indianapolis, in the county of Marion and State of Indiana, have invented certain new and useful Improvements in Motor-Cars, of which the following is a specification.

This invention relates to that class of motor-cars in which the power is generated by an internal-combustion engine and transmitted from this prime mover to the car-axle by means of electricity.

It relates more particularly to a special arrangement of gasolene-engine, dynamo, storage battery, and electric motor, the object of which is to secure in a motor-car efficiency and convenience of operation.

I accomplish the objects of the invention by the mechanism illustrated in the accompanying drawings, in which—

Figure 2:
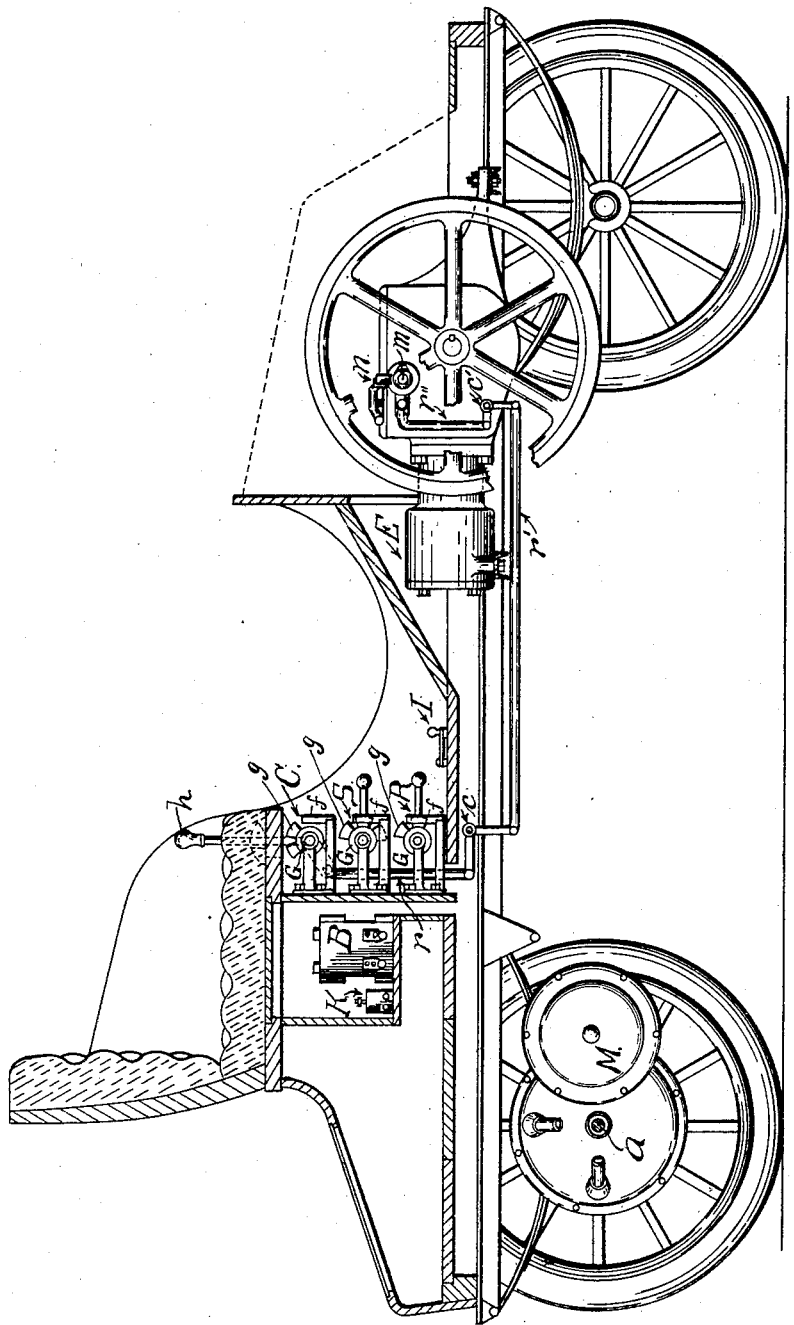
Figure 3:
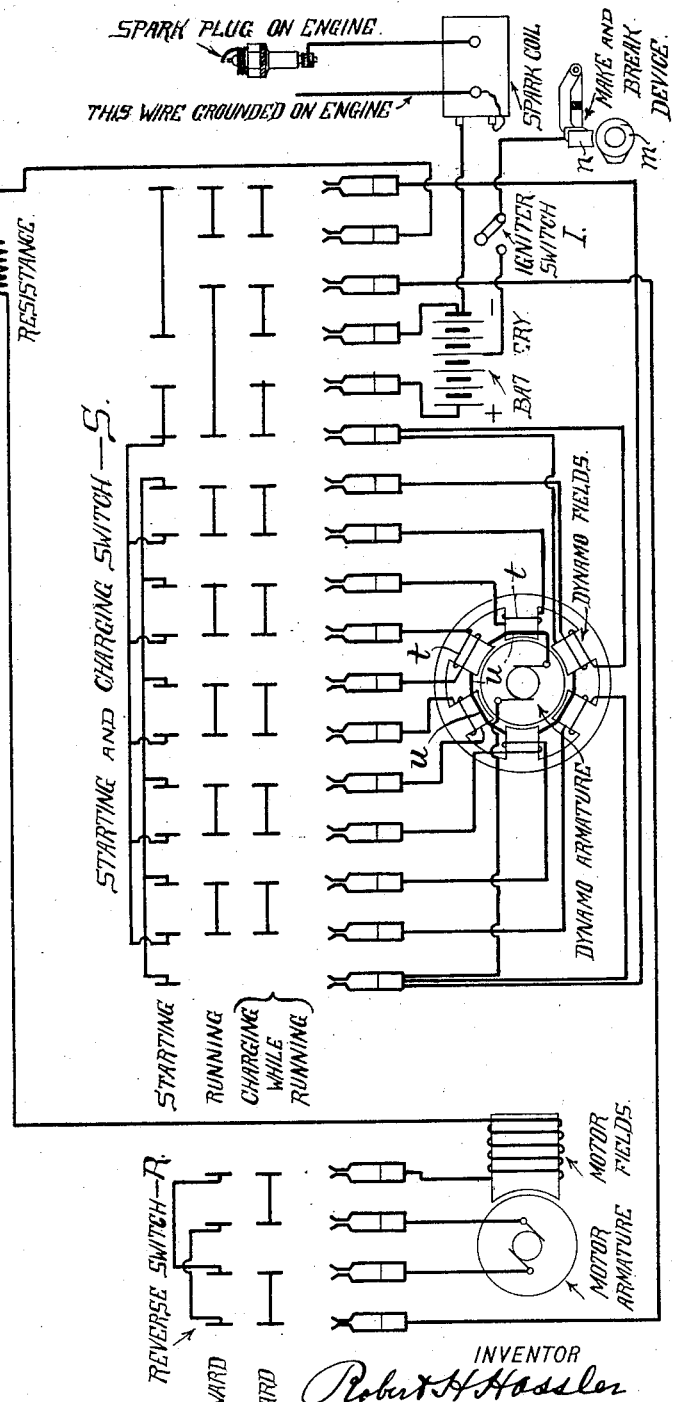

Figure 1 is a plan view of my invention, and Fig. 2 a side elevation of same, both views being partially in section. Fig. 3 is a wiring diagram showing the electrical connections between the various parts. Figs. 4, 5, 6, and 7 are parts of the same diagram, illustrating more clearly the electrical actions that occur when the vehicle is in operation. Fig. 8 is a detail in side elevation and partial section of my invention on a larger scale than used in Fig. 2, and Fig. 9 a detail in top plan view of the make-and-break device of my invention.

Like letters of reference indicate like parts throughout the several views of the drawings.

By reference to Figs. 1 and 2 it is seen that the gasolene-engine E is permanently connected to the dynamo D, the armature of the dynamo being securely keyed to an extension of the engine-shaft. The vehicle is driven by an electric motor M, attached to the axle-truss and permanently geared to the live-axles $a\ a'$. The body of the vehicle contains the controller C, the starting and charging switch S, the reverse-switch R, and the igniter-switch I. The body also contains a small storage battery B, which in this particular illustration consists of six cells, and spark-coil K for igniting the engine. The engine contains a make-and-break device consisting of a contact-cam $m$ and insulated brush $n$, which is adjustable with relation to the piston position, so that the time of ignition may be made early or late. In starting the spark is produced in the cylinder after the crank has passed its center, so that the engine will start in its proper direction. After starting the engine the time of ignition is advanced to increase the power and speed of the engine. The make-and-break device $m\ n$ is connected by the rods $r\ r'\ r''$ and bell-cranks $c\ c'$ to the controller C, (see Fig. 2,) so that whenever the operator shifts the controller-handle $h$ the spark position is changed simultaneously with the changes in the electrical connections between the dynamo and the motor.

The controller C and the switches S and R are all similar in mechanical construction. Each consists of one row of fixed insulated contacts $f$, mounted on a hard-wood block in front of a cylinder G. Each cylinder is rotatable in journals and carries rows of movable contacts $g$. These rows may by means of a lever $h$, which rotates the cylinder, be brought to engage with the fixed contacts, so as to interconnect the latter, making a different electrical connection for each row of contacts on the cylinder. The detailed mechanical construction of such devices is not shown on the drawings, as it is well known to those familar with the art.

Many accessories of the complete motor-car—such as tanks, steering-gear, and brakes—are not shown.

To run slowly on good roads, where the required torque is light, I retard the time of the engine ignition, this being accomplished by the same controller that electrically connects the dynamo with the motor.

The engine is started by connecting the storage battery to the dynamo, so that the latter acts as a motor temporarily, thus giving the engine sufficient turning effort to start. The vehicle is at rest and the vehicle-motor entirely out of circuit while the engine is being started.

Figure 4:
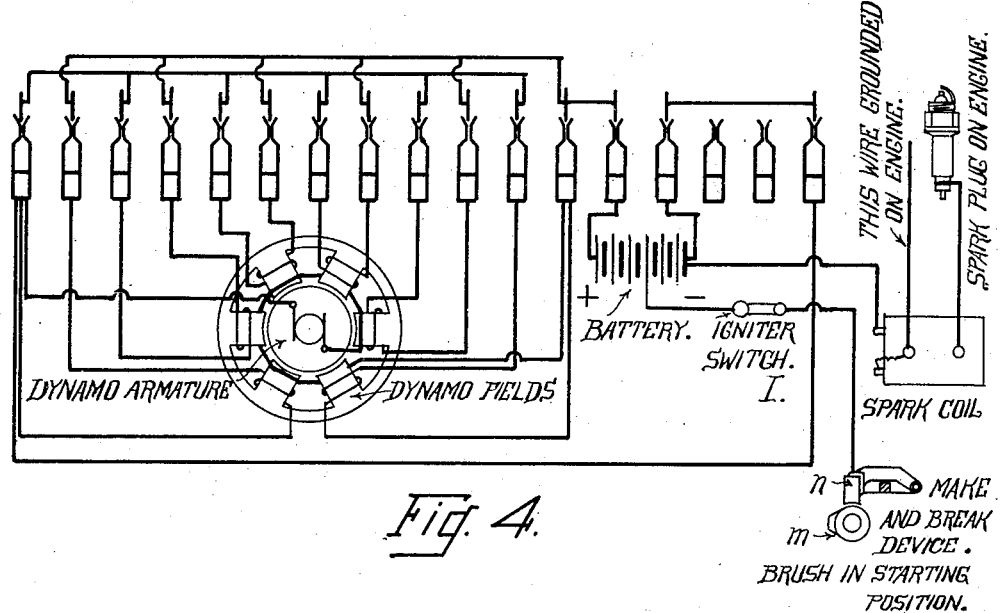
Figure 5:
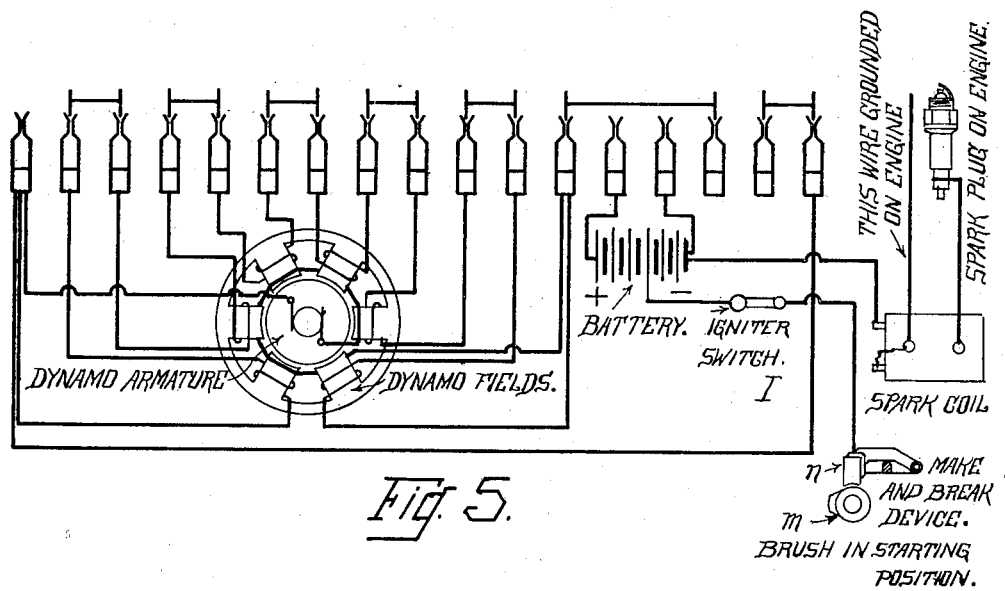

The functions of the controlling devices will now be described in detail, reference being had to the diagrams Figs. 3, 4, 5, 6, and 7. When the engine is being started, the igniter-switch I is closed and the switch S thrown into the starting position. The electrical connections will then be made, as shown in Fig. 4, where the dynamo is temporarily converted into a low-voltage motor with the armature connected to the battery and the field-coils in parallel with each other and also connected across the battery—that is, each of the six fine-wire field-coils is independently connected to the battery and receives the full battery voltage. This connection results in a rush of current, which starts the engine rotating until the explosions occur in the cylinder with sufficient force to run the engine. The operator then turns switch S to the running position, thus forming the electrical connections shown in Fig. 5. The dynamo now becomes a high-voltage generator, its fine-wire field-coils being connected across the armature, but in series with each other, so that each coil receives only one-sixth of the armature voltage. The dynamo is also disconnected from the battery. The engine is prevented from racing by the fact that the controller is in the "off" position, and the contact device $m\ n$ makes a late spark, which not only causes the engine to start in the right direction, but also keeps the engine speed down while the dynamo is disconnected from its load. The engine now being started, when it is desired to start the vehicle the controller-switch C is thrown to its "first-speed" position, thus making the connections shown in Fig. 6. This operation electrically connects the dynamo with the vehicle-motor through the resistance and at the same time advances the spark by mechanically shifting the insulated brush $n$ on the make-and-break device. The vehicle now runs at a slow speed, this reduction of speed being due partly to the resistance inserted between the dynamo and the motor and partly to the fact that the spark has not yet been advanced to the maximum early position.

For full power the operator throws the controller C to the "second-speed" position and produces the connections shown in Fig. 7. The dynamo is now directly connected to the motor and the spark simultaneously shifted to the full-power position, where the engine runs at its highest speed.

Having thus fully described my invention, what I claim as new, and wish to secure by Letters Patent, is—

1. In a motor-car, an internal-combustion engine, a dynamo driven thereby, an electric motor geared to the driving-wheels of the car, a controller for electrically connecting the dynamo with the motor and simultaneously shifting the sparking time of the engine.

2. In a motor-car, an internal-combustion engine, a dynamo driven by said engine, an electric motor geared to the driving-wheels of the car, a controller for changing the electrical connections between the dynamo and the motor, and simultaneously shifting the sparking time of the engine.

3. In a motor-car, an internal-combustion engine, a sparking mechanism, a dynamo permanently connected to said engine, an electric motor permanently connected to the driving-wheels of the car, a controller for electrically connecting the dynamo with the motor, and levers connecting said controller and sparking mechanism whereby the sparking mechanism of the engine is shifted when the controller-lever is changed.

In witness whereof I have hereunto set my hand and seal, at Indianapolis, Indiana, this 15th day of November, A. D. 1902.

ROBERT H. HASSLER. [L. S.]

Witnesses:
   JOSEPH A. MINTURN,
   S. MAHLON UNGER.